US012588588B2

(12) United States Patent
McGrath et al.

(10) Patent No.: US 12,588,588 B2
(45) Date of Patent: Mar. 31, 2026

(54) LOCK OFF ASSEMBLIES FOR TRIMMERS

(71) Applicant: Milwaukee Electric Tool Corporation, Brookfield, WI (US)

(72) Inventors: Matthew D. McGrath, Brookfield, WI (US); Jonathan S. Keller, Brookfield, WI (US); Timothy M. Rodenkirch, Brookfield, WI (US); Eric J. Boticki, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/405,468

(22) Filed: Jan. 5, 2024

(65) Prior Publication Data

US 2024/0224851 A1 Jul. 11, 2024

Related U.S. Application Data

(60) Provisional application No. 63/437,492, filed on Jan. 6, 2023.

(51) Int. Cl.
*A01D 34/82* (2006.01)
*A01D 34/90* (2006.01)
*B25F 5/02* (2006.01)
(52) U.S. Cl.
CPC .......... *A01D 34/828* (2013.01); *A01D 34/90* (2013.01); *B25F 5/02* (2013.01); *A01D 2034/907* (2013.01)
(58) Field of Classification Search
CPC .................. A01D 34/828; A01D 34/90; A01D 2034/907; B25F 5/02
See application file for complete search history.

(56) References Cited

U.S. PATENT DOCUMENTS

| | | | | |
|---|---|---|---|---|
| 10,779,468 B2 | | 9/2020 | Ota et al. | |
| 11,485,003 B2 | * | 11/2022 | McCue | .................... B25F 3/00 |
| 2002/0092179 A1 | * | 7/2002 | Kobayashi | .............. F02D 11/02 |
| | | | | 30/277.4 |
| 2010/0313430 A1 | * | 12/2010 | Yamaoka | ............. A01D 34/828 |
| | | | | 30/276 |
| 2016/0088792 A1 | * | 3/2016 | Yamaoka | ............... A01D 34/81 |
| | | | | 30/276 |
| 2018/0117755 A1 | * | 5/2018 | Schulz | .................... B27B 17/00 |
| 2020/0306949 A1 | * | 10/2020 | Zhu | ......................... A01G 3/086 |
| 2021/0001467 A1 | * | 1/2021 | Luecke | ................ A01D 34/902 |
| 2021/0015034 A1 | * | 1/2021 | Ito | .......................... A01G 3/086 |
| 2022/0072732 A1 | * | 3/2022 | Schlosser | ............. B23D 57/023 |

(Continued)

*Primary Examiner* — Omar Flores Sanchez
(74) *Attorney, Agent, or Firm* — Dority & Manning, P.A.

(57) ABSTRACT

Lock off assemblies for trimmers are provided. A trimmer includes a working head; a handle assembly connected to the working head by a connecting member; a trigger connected to the handle assembly and movable between an off position and an on position, wherein the trigger being in the on position causes actuation of the working head; and a lock off assembly. The lock off assembly includes a switch connected to the handle assembly and movable between a safe position and an operate position; and a pivotable extension pivotably connected to the switch, wherein the pivotable extension contacts and blocks the trigger when the switch is in the safe position and the trigger is moved from the off position towards the on position, and wherein the trigger is free to move between the off position and the on position when the switch is in the operate position.

20 Claims, 4 Drawing Sheets

(56) References Cited

U.S. PATENT DOCUMENTS

| | | | | |
|---|---|---|---|---|
| 2022/0080914 A1* | 3/2022 | Bartel | .................... | B60R 21/11 |
| 2022/0256774 A1* | 8/2022 | Shimizu | ............. | B27B 17/0008 |
| 2022/0346312 A1* | 11/2022 | Takahashi | ............. | A01D 34/68 |
| 2024/0122098 A1* | 4/2024 | Hou | ....................... | A01D 34/67 |

* cited by examiner

1

LOCK OFF ASSEMBLIES FOR TRIMMERS

CROSS-REFERENCE TO RELATED APPLICATIONS

The present application claims priority to U.S. Provisional Patent Application No. 63/437,492 filed on Jan. 6, 2023, the disclosure of which is incorporated by reference herein in its entirety.

FIELD

The present disclosure relates generally to trimmers, and more particularly to lock off assemblies for powered trimmers.

BACKGROUND

Power tools are generally used to perform manual operations while reducing the required amount of manual labor. For example, trimmers, brush cutters, edges or the like (collectively referred to herein as trimmers) can be utilized for trimming grass, weeds, brush, or shrubs. Trimmers generally utilize a tool implement such as a trimmer line or blade which is spun at high speeds to break the grass and weeds. Actuation of the tool implement can be selectively actuated by an operator using a trigger or other similar device. However, the trigger may be subject to accidental or unintended activation. Moreover, mechanisms that attempt to mitigate accidental or unintended activation of the trigger may cause the trigger to get stuck in an undesirable position.

Accordingly, alternative lock off assemblies for trimmers would be welcome in the art.

BRIEF DESCRIPTION

Aspects and advantages of the invention in accordance with the present disclosure will be set forth in part in the following description, or may be obvious from the description, or may be learned through practice of the technology.

In accordance with one embodiment, a trimmer is provided. The trimmer includes a working head; a handle assembly connected to the working head by a connecting member; a trigger connected to the handle assembly and movable between an off position and an on position, wherein the trigger being in the on position causes actuation of the working head; and a lock off assembly. The lock off assembly comprises a switch connected to the handle assembly and movable between a safe position and an operate position; and a pivotable extension pivotably connected to the switch, wherein the pivotable extension contacts and blocks the trigger when the switch is in the safe position and the trigger is moved from the off position towards the on position, and wherein the trigger is free to move between the off position and the on position when the switch is in the operate position.

In accordance with another embodiment, a handle assembly for operating a working implement via a motor is provided. The handle assembly includes a trigger movable between an off position and an on position, wherein the trigger being in the on position causes the motor to actuate the working implement; and a lock off assembly. The lock off assembly comprises a switch movable between a safe position and an operate position; and a pivotable extension pivotably connected to the switch, wherein the pivotable extension contacts and blocks the trigger when the switch is in the safe position and the trigger is moved from the off position towards the on position, and wherein the trigger is free to move between the off position and the on position when the switch is in the operate position.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
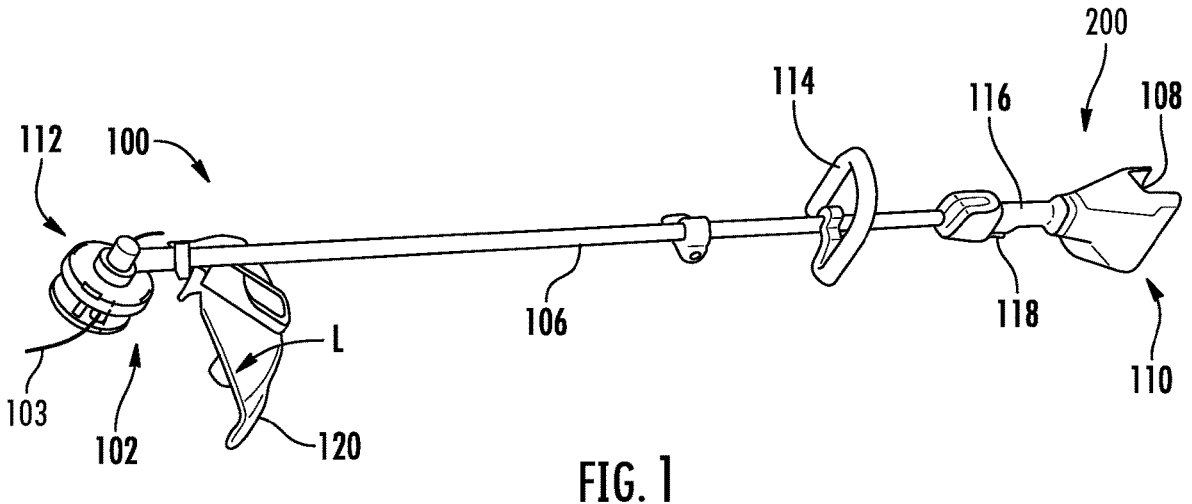
FIG. 1 is a perspective view of a trimmer in accordance with one or more embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "power tool" is intended to refer to a device which is used to perform a work operation, such as cutting grass, weeds, brush, shrubs, or the like. By way of non-limiting example, power tools can include trimmers, brush cutters, edgers, hedge trimmers, string trimmers, cutters or the like. While embodiments provided below are directed to trimmers, one or more components of the trimmers described below, such as the handle assembly, trigger, and lock off assembly, may be utilized with one or more different types of power tools.

As used herein, the terms "actuate" and its variants are intended to refer to any physical manipulation of a component. Actuation can include, for example, rotating, reciprocating, translating, or otherwise moving a component such as a working tool (e.g., string, blades, disks, or the like).

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, trimmers described in accordance with one or more embodiments herein include a handle assembly that has a trigger and a lock off assembly. The trigger is movable between an on position and an off position to dictate the operational condition of the trimmer by the operator. However, the lock off assembly can selectively prevent the trigger from reaching the on position. The lock off assembly includes a switch that is movable between an operate position and a safe position. When the switch is in the operate position, the trigger is free to reach its on position for operation of the trimmer. However, when the switch is in the safe position, a pivotable extension connected to the switch will make contact with and block the trigger as the trigger is moved towards the on position. The lock off assembly thereby facilitates safe operation of the trimmer by preventing unintended or accidental operation of the motor. However, by providing the pivotable extension on the lock off assembly, as opposed to the trigger for example, the trigger can be less prone to getting stuck in an unwanted position.

Referring now to the drawings, FIG. 1 illustrates a trimmer 100 generally including a working head 102, a handle assembly 200, and a connecting member 106 extending between the working head 102 and the handle assembly 200.

While the illustrated apparatus is generally referred to herein as a "trimmer," it should be appreciated that this is a term of convenience and can additionally, or alternatively, constitute a brush cutter, edger, hedge trimmer, string trimmer, cutter, or other similar device or power tool with alternative nomenclature.

In this regard, the working head 102 can include a working implement 103 that can be utilized for trimming grass, weeds, brush, shrubs, or the like. The working head 102 and working implement 103 can comprise a variety of different types of tools such as, for example, a string line, a blade, a disk, a cutter or the like. For example, in some embodiments, the trimmer 100 can constitute a string trimmer wherein the working implement 103 is an extendable string line. The working head 102 can thereby spin the string line at a high rate of speed to cut debris. In some embodiments, the trimmer 100 can constitute a brush cutter wherein the working implement 103 is a plurality blades radially extending from a central body. The working head 102 can thereby spin central body, and thus the plurality of radially extending blades, at a high rate of speed to cut debris. While certain types of trimmers 100 are explicitly disclosed herein, it should be appreciated that these are not intended to be limiting and other embodiments may further be realized within the scope of this disclosure.

In some embodiments, the trimmer 100 can further include a guard 120 configured to protect the operator from flying debris kicked up by the working head 102. In certain instances, the guard 120 can be engaged with the connecting member 106 and be disposed adjacent to the working head 102.

Still referring to FIG. 1, the handle assembly 200 may generally include a grip portion 116 and user interface 118 (e.g., trigger) for an operator to hold and operator the trimmer 100. In some embodiments, the trimmer 100 may extend from a first end 110 to a second end 112 with the handle assembly 200 being disposed at the first end 110 and the working head 102 being disposed at the second end 112 wherein the connecting member 106 (e.g., pole) extends therebetween. The connecting member 106 may be an elongated pole, such as a telescoping pole, to provide an extended reach configuration.

The grip portion 116 of the handle assembly can include, for example, a portion of the handle assembly 200 including the user interface 118. The user interface 118 can include a trigger that allows the operator to selectively control the trimmer 100. The user interface 118 can further include other controls which permit the operator to effect change to the trimmer 100. For instance, by way of non-limiting example, the user interface 118 may include any one or more of a cruise control feature allowing the operator to maintain the operating speed of the working head 102, a turbo which allows the trimmer 100 to reach full operational speed, a power switch having at least ON and OFF functionality, a safety, or any other desirable user controls. In the illustrated embodiment, the grip portion 116 and user interface 118 are disposed between the first end 110 and the second end 112. In other embodiments, the relative arrangement of the grip portion 116, user interface 118, or other components can be varied.

The handle assembly 200 may further include one or more additional components for operation of the trimmer 100. For instance, the handle assembly 200 can include a port 108 (e.g., a battery receiving compartment or an electrical socket) and/or a motor (not illustrated) configured to be electrically connected with a power source, such as a battery (not illustrated) or wall outlet. The port 108 is illustrated as being disposed at a first end 110 of the trimmer 100 and the working head 102 is disposed at a second end 112 of the trimmer 100. In other embodiments, either one or both of the port 108 or working head 102 can be spaced apart from the first end 110 or second end 112, respectively. In certain instances, the trimmer 100 may be electrically powered, e.g., via the battery or through a wall outlet. In other instances, the trimmer 100 may be powered by a fuel, such as gasoline.

In some embodiments, the trimmer 100 may include a secondary handle 114 to form a supplemental handle for ease of operation by an operator. The secondary handle 114 can allow the operator to support the weight of the trimmer 100 during operation. For instance, the secondary handle 114 can be disposed along the connecting member 106 to permit a second point of contact via a first hand of the operator while also holding the handle assembly 200 with the second hand of the operator.

Figures 2A, 2B:
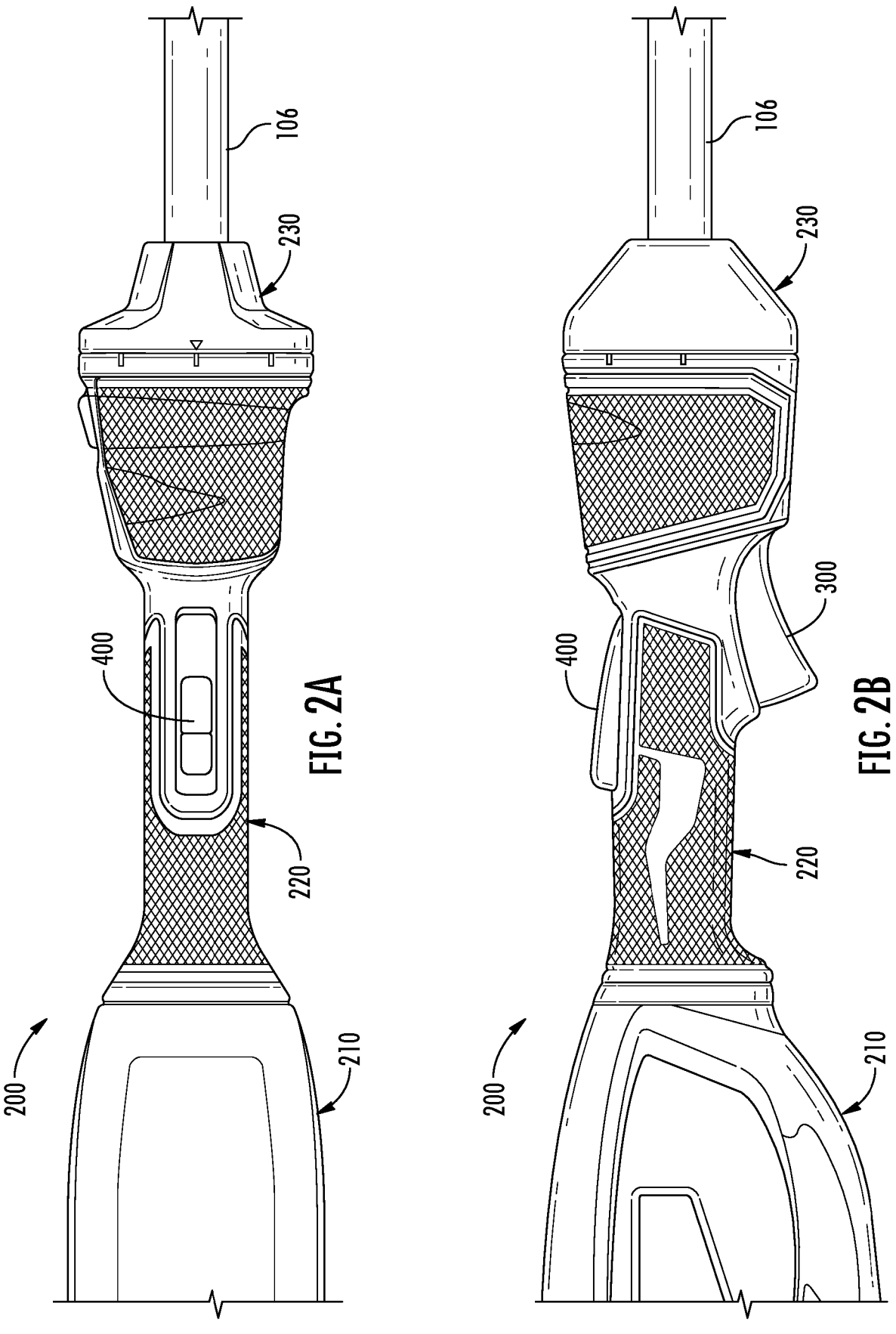
FIG. 2A is a top view of a handle assembly for a trimmer in accordance with embodiments of the present disclosure.
FIG. 2B is a side view of the handle assembly illustrated in FIG. 2A in accordance with embodiments of the present disclosure.

Referring now to FIGS. 2A and 2B, top and side views are illustrated, respectively, of a portion of the handle assembly 200, such as for utilization with the trimmer 100 illustrated in FIG. 1.

The handle assembly 200 generally can include a base portion 210 and a handle portion 220, wherein the base portion 210 is connected to or extends from the handle portion 220. The handle assembly 200 can further comprise one or more components to power, control, or otherwise facilitate operation of the trimmer 100. The base portion 210 can comprise a first portion of the handle assembly 200, such as a portion that may comprise a motive device and/or power supply. For instance, the base portion 210 of the handle assembly 200 may be the portion that is closest to the first end 110 of the trimmer 100, and thus furthest from the working head 102 (as illustrated in FIG. 1).

Figures 3A, 3B:
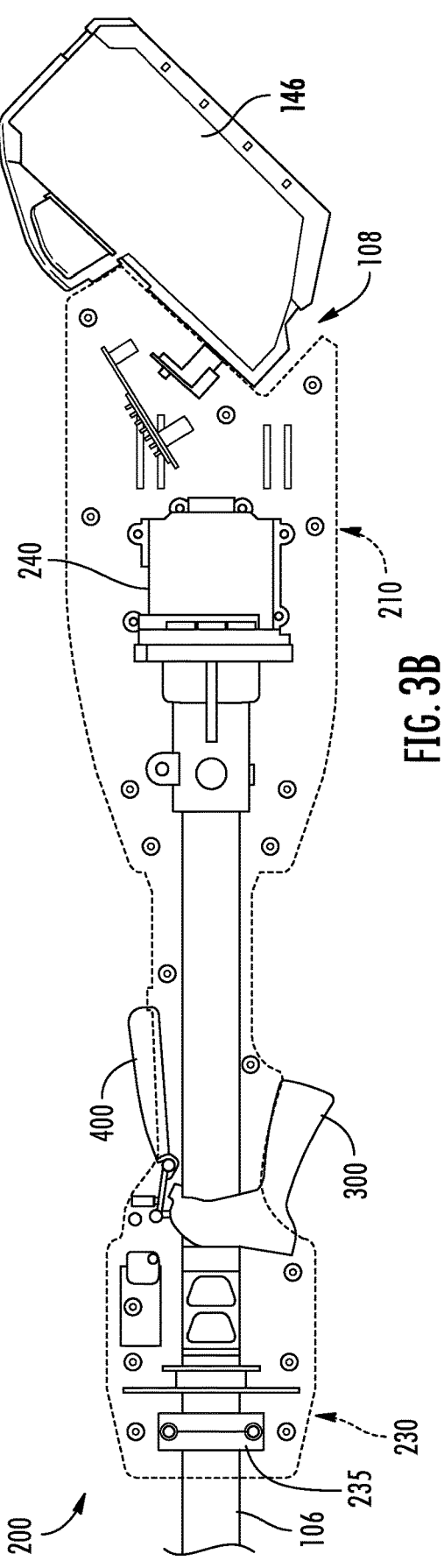
FIG. 3A is a top interior view of a handle assembly for a trimmer in accordance with embodiments of the present disclosure.
FIG. 3B is a side interview view of the handle assembly illustrated in FIG. 3A in accordance with embodiments of the present disclosure.

With additional reference to FIGS. 3A and 3B, top and side views are illustrated, respectively, of the handle assembly 200 to illustrate one or more of the exemplary components that can be associated with one or more parts of the handle assembly 200. For instance, as illustrated, the base portion 210 may comprise a motor 240. The motor 240 can comprise any device suitable for actuating the working head 102 of the trimmer 100, such as an electric motor (as illustrated) or a gas engine. The base portion 210 may further comprise a power supply system for the motor 240. For instance, the base portion 210 may comprise a port 108 configured as a battery receiving area for selectively receiving one or more batteries 146 for powering the motor 240. The one or more batteries 146 can be rechargeable batteries, single use batteries, or combinations thereof.

The handle portion 220 can comprise a second portion of the handle assembly 200, such as a portion that may be gripped by an operator when using the trimmer 100. For instance, the handle portion 220 may be next to the base portion 210 in the direction towards the second end 112 of the trimmer 100, and thus towards the working head 102 (as illustrated in FIG. 1). The handle portion 220 may also be configured to be gripped by the operator when using the trimmer 100. For instance, the base portion 210 may comprise a first cross sectional diameter CB that is perpendicular to the longitudinal axis of the handle assembly 200, wherein the longitudinal axis runs down the length of the trimmer from the handle assembly 200 to the working head 102. Likewise, the handle portion 220 can comprise a second cross sectional diameter CH that is perpendicular to the longitudinal axis L of the handle assembly 200. The second cross sectional diameter CH of the handle portion 220 can be smaller than the first cross sectional diameter CB of the base portion 210 to provide a more narrow and tapered grip area for the operator. Moreover, the relatively larger base portion 210 may also provide additional balance to the trimmer by positioning a larger section of the housing (potentially with heavier components like the motor 240 and battery 146) on the opposite side of the operators grip than the working head 102. However, while the trimmer 100 is illustrated as having the handle portion 220 between the base portion 210 and the working head 102, it should be appreciated that the trimmer 100 may alternatively comprise a handle assembly 200 having the base portion 210 between the handle portion 220 and the working head 102.

With reference to FIGS. 2A-3B, in some embodiments, such as that illustrated, the handle assembly 200 may further comprise a top portion 230. The top portion 230 can comprise an additional portion of the handle assembly 200 such as to support or otherwise connect adjacent components such as the connecting member 106 or working head 102 (FIG. 1). For instance, the top portion 230 of the handle assembly 200 can be next to the handle portion 220 in the direction towards the second end 112 of the trimmer 100, and thus towards the working head 102 (as illustrated in FIG. 1). As such, the handle portion 220 can be disposed between the base portion 210 and the top portion 230.

When present, the top portion 230 can help provide additional support or components for the trimmer 100. For instance, in some embodiments, the motor 40 may be contained in the top portion 230 while the port 108 (and/or battery 146) may be disposed in or connected to the base portion 210. In some embodiments, the top portion 230 may comprise a forward clamp 235. The forward clamp 235 can secure the connecting member 106, the working head 102, or other interconnected components to the handle assembly 200. The forward clamp 235 may thereby selectively receive and release the connecting member 106, for example, for assembly or maintenance operations of the trimmer 100. In some embodiments, the connecting member 106 may thereby extend through at least the top portion 230 of the housing. As illustrated in FIGS. 3A and 3B, the connecting member 106 may extend through the top portion 230, the handle portion 220, and into the base portion 210. As such, the motor 240 disposed in the base portion 210 can directly engage with the connecting member 106 (such as an axle in the connecting member 106) for downstream mechanical control of the working head 102.

The handle assembly 200 can further comprise one or more components for controlling operation of the trimmer 100, including one or more components to prevent or mitigate unintended operation. For instance, the handle assembly 200 can include a trigger 300 and a lock off assembly 400 for selectively operating the trimmer 100. The trigger 300 and lock off assembly 400 can be disposed in any suitable position or positions around the handle assembly 200 that provides suitable access to an operator. For instance, as illustrated in FIGS. 2A-3B, the handle portion 220 may comprise the trigger 300 and the lock off assembly 400.

In general, the trigger 300 is configured to selectively activate the motor 240 such that the motor 240 actuates (e.g., rotates, reciprocates, or otherwise actuates) the working head 102. As such, the operator of the trimmer 100 may grip the handle assembly 200 via, for example, the handle portion 220 while conveniently operating the trimmer via the trigger 300 disposed on the handle portion 220.

The lock off assembly 400 acts in cooperation with the trigger 300 to operate the motor 240. That is, the lock off assembly 400 prevents actuation of the trigger 300 unless the lock off assembly 400 itself is in a specific position to collectively provide a two-step actuation process before the motor 240 is operated. The lock off assembly 400 thereby inhibits inadvertent or undesired operation of the working head 102 from accidental interaction with the trigger 300. The lock off assembly 400 can be disposed on the handle portion 220 similar to the trigger 300 to facilitate single handed control operations of the trimmer 100. For instance, the trigger 300 may be disposed on a bottom side of the handle portion 220 while the lock off assembly 400 can be located on the top side of the handle portion 220, opposite the trigger 300. As such, an operator may naturally or conveniently move, hold, or depress the lock off assembly 400 when gripping the handle portion 220. The operator may then selectively move, hold, or depress the trigger 300 while remaining gripped on the handle portion 220. However, it should be appreciated, that additional or alternative placements of the trigger 300, lock off assembly 400, or other components may also be realized within the scope of this disclosure.

Figure 4:
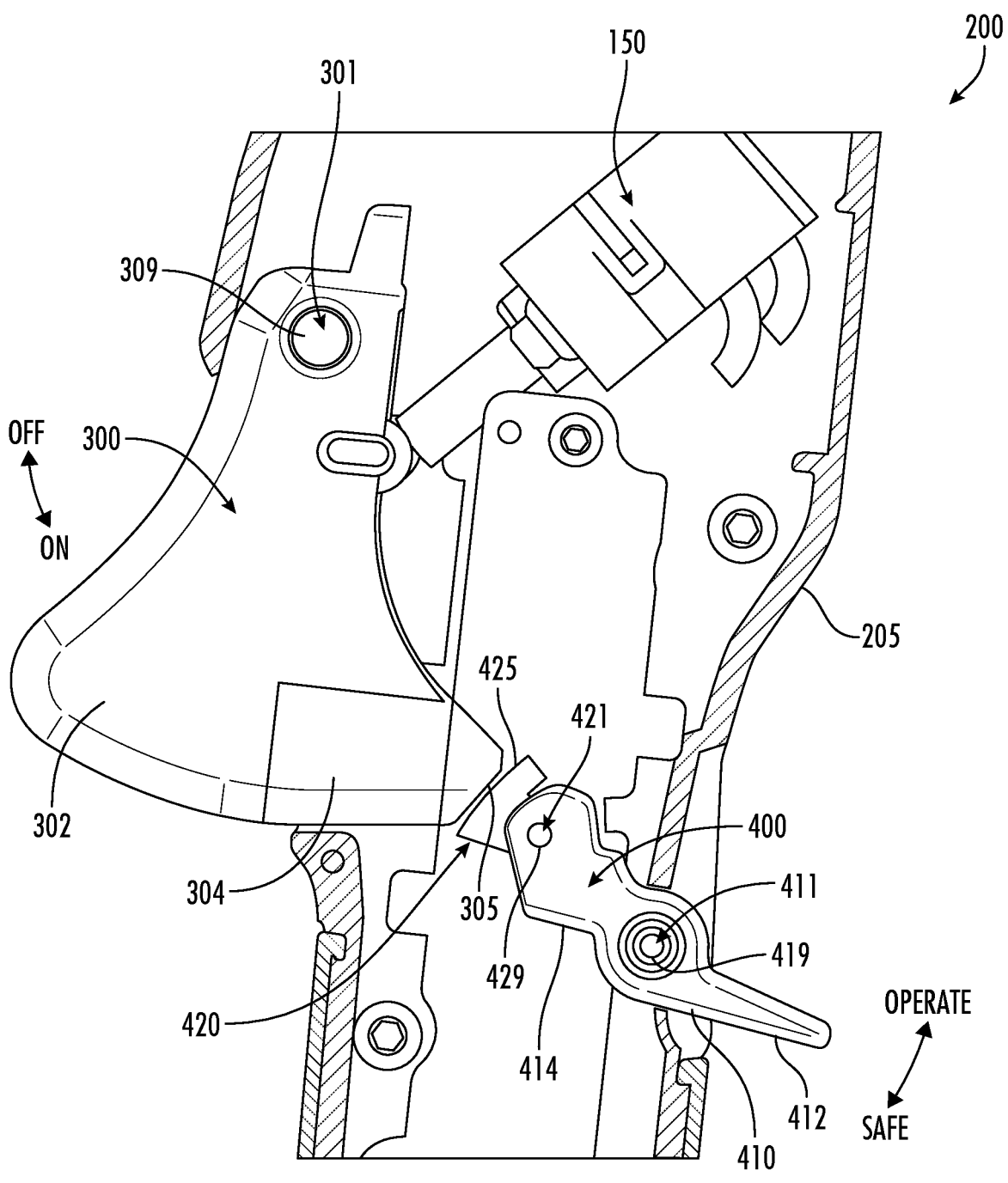
FIG. 4 is an internal view of a housing assembly having a trigger and a lock off assembly in accordance with embodiments of the present disclosure.

With reference to FIG. 4, an internal view of the handle assembly 200 having the trigger 300 and the lock off assembly 400 is illustrated.

The trigger 300 can be connected to the handle assembly 200 and movable between an off position and on position. When in the on position, the trigger 300 causes actuation of the working head 102 (FIG. 1). That is, the trimmer 100 may remain in an off state until the trigger 300 is moved (e.g., depressed) to the on position, at which point the motor 240 (FIGS. 3A and 3B) activates and drives the working head 102 (FIG. 1).

In some embodiments, the trigger 300 controls a binary on/off state of the trimmer. That is, when the trigger 300 is in any position except the on position, the trimmer is off, and when the trimmer is in the defined on position, the trimmer is on and running. In some embodiments, the trigger 300 may control a variation of the operation of the trimmer, such as variable speed, force, or power of the trimmer. That is, as the trigger 300 is continuously moved towards the on position, the one or more operational parameters (e.g., speed, force, or power) can continuously increase until the trigger 300 reaches the final state of the position. Then, as the trigger 300 is moved back towards the off position, said operational parameters decrease until they cease. In some embodiments, the trigger 300 must travel at least a threshold amount (e.g., halfway) towards the on position before the trimmer starts running. Such embodiments can prevent unintended activation of the trimmer when the trigger 300 is bumped or only slightly depressed.

The trigger 300 can be partially disposed in a housing 205 (e.g., shell) of the handle assembly 200 such that a first portion 302 is disposed outside of the housing 205 and a second portion 304 is disposed inside the housing 205. When operating the trimmer and the trigger 300 is moved from the off position to the on position, the amount of the trigger 300 disposed outside of the housing 205 can decrease such that the trigger 300 becomes more recessed within the handle assembly 200.

The trigger 300 can be connected to the handle assembly 200 in any suitable configuration such that it can move between the off position and on position, subject to any blocking conditions by adjacent components (e.g., the lock off assembly 400). For instance, the trigger 300 may be pivotably connected to the handle assembly 200 about a first pivot axis 301 such as by using a pin 309. In some embodiments, the first pivot axis 301 may be substantially orthogonal to the length of the handle assembly 200.

Moreover, the trigger 300 can be biased towards the off position, such as by a spring or the like. For instance, the trigger 300 may be biased so that a large portion of the trigger 300 is disposed outside of the housing 205 of the handle assembly 200 by default.

In some embodiments, the handle assembly 200 may further comprise an actuator 150 adjacent the trigger 300. The actuator 150, or at least a portion thereof, can be depressed as the trigger 300 is moved from the off state to the on state. As the actuator 150 is depressed by the trigger 300, the actuator can signal or otherwise cause the motor to operate. The actuator 150 can control the motor in a binary on/off manner, or can control the motor in a variable manner that dictates a variable amount of force used between the off state and fully on state.

Still referring to FIG. 4, the handle assembly further includes the lock off assembly 400. The lock off assembly is configured to selectively prevent the trigger 300 from activating the trimmer (i.e., reaching the on position). For instance, as illustrated in FIG. 4, the lock off assembly 400 includes a switch 410 and a pivotable extension 420.

The switch 410 is connected to the handle assembly 200 and movable between a safe position and an operate position. As disclosed herein, when the switch 410 is in the safe position, the trigger 300 is blocked from reaching its on position. Conversely, when the switch 410 is in the operate position, the trigger 300 is able to reach its on position.

The switch 410 can be partially disposed in the housing 205 of the handle assembly 200 such that a first portion 412 is disposed outside of the housing 205 and a second portion 414 is disposed inside the housing 205. In some embodiments, when operating the trimmer and the switch 410 is moved from the safe position to the operate position, the location of the first portion 412 outside the housing 205 is changed. For instance, the first portion 412 of the switch 410 may be substantially rearward facing (e.g., away from the working head 102 and towards the first end 110 of the trimmer 100 (FIG. 1)) when in the safe position. Then, as the switch 410 is moved by the operator, the first portion 412 of the switch 410 can become substantially forward facing (e.g., towards the working head 102 and towards the second end 112 of the trimmer 100 (FIG. 1)). In some embodiments, when operating the trimmer and the switch 410 is moved from the safe position to the operate position, the amount of the switch 410 disposed outside of the housing 205 can decrease such that the switch 410 becomes more recessed within the handle assembly 200 when moving towards the operate position.

The switch 410 can be connected to the handle assembly 200 in any suitable configuration such that it can move between the safe position and operate position by an operator. For instance, the switch 410 may be pivotably connected to the handle assembly 200 about a second pivot axis 411 such as by using a pin 419. The second pivot axis 411 may be substantially orthogonal to the length of the handle assembly 200. In some embodiments, the second pivot axis 411 of the switch 410 can be parallel to the first pivot axis 301 of the trigger 300.

Moreover, the switch 410 can be biased towards the safe position, such as by a spring or the like. For instance, the switch 410 may be biased so that the first portion 412 of the switch 410 is substantially rearward facing by default until the operator forces the first portion 412 forward.

The pivotable extension 420 of the lock off assembly 400 is pivotably connected to the switch 410 and can be entirely disposed in the housing 205 of the handle assembly 200. The pivotable extension 420 is the piece of the lock off assembly 400 that contacts and blocks the trigger 300 when the switch 410 is in the safe position and the trigger 300 is moved towards the on position. It should be appreciated that the trigger 300 may still have the ability to have partial movement from the off position towards the on position when the switch 410 is in the safe position. However, as the trigger 300 is further moved towards the on position, the pivotable extension 420 of the lock off assembly 400 will contact and block the trigger 300 from further movement, thereby preventing the trigger from reaching the on position.

That is, a first contact surface 305 of the trigger 300 can come into contact with a second contact surface 425 of the pivotable extension 420 of the lock off assembly 400. In some embodiments, the first contact surface 305 and the second contact surface 425 may both be curved. For instance, the first contact surface 305 may be concave a the second contact surface 425 may be convex.

In some embodiments, once the first contact surface 305 contacts the second contact surface 425, further movement of the trigger 300 can cause the pivotable extension 420 to pivot until it reaches a threshold, at which point, the pivotable extension 420 blocks the trigger 300 from any further movement towards the on position, and notably, prevents the trigger 300 from reaching a position that would activate the motor. The pivotable ability of the pivotable extension 420 allows for the lock off assembly 400 to selectively block the trigger 300 from reaching the on position, but without using a mechanism that may unintentionally cause the trigger 300 to get stuck in certain positions during operation of the trimmer. For instance, as the trigger 300 is released, the pivotable extension 420 may pivot back to a previous position, as opposed to potentially remaining wedged against the trigger 300.

The pivotable extension 420 may be pivotably connected to the switch 410 of the lock off assembly about a third pivot axis 421 such as by using a pin 429. The third pivot axis 421 may be substantially orthogonal to the length of the handle assembly 200. Moreover, in some embodiments, the third pivot axis 421 of the pivotable extension 420 can be parallel to the first pivot axis 301 of the trigger 300 and the second pivot axis 411 of the switch 410.

Lock off assemblies for trimmers as disclosed herein can thereby facilitate safe operation of the trimmer by preventing unintended or accidental operation of the motor. However, by providing the pivotable extension on the lock off assembly, as opposed to the trigger for example, the trigger can be less prone to getting stuck in an unwanted position.

Further aspects of the invention are provided by one or more of the following embodiments:

A trimmer comprising a working head; a handle assembly connected to the working head by a connecting member; a trigger connected to the handle assembly and movable between an off position and an on position, wherein the trigger being in the on position causes actuation of the working head; and a lock off assembly. The lock off assembly comprises a switch connected to the handle assembly and movable between a safe position and an operate position; and a pivotable extension pivotably connected to the switch, wherein the pivotable extension contacts and blocks the trigger when the switch is in the safe position and the trigger is moved from the off position towards the on position, and wherein the trigger is free to move between the off position and the on position when the switch is in the operate position.

The trimmer of any clause herein, wherein the trigger is partially disposed in the handle assembly.

The trimmer of any clause herein, wherein the switch is partially disposed in the handle assembly.

The trimmer of any clause herein, wherein the trigger is pivotably connected to the handle assembly.

The trimmer of any clause herein, wherein the switch is pivotably connected to the handle assembly.

The trimmer of any clause herein, wherein the trigger is pivotable about a first pivot axis, wherein the switch is pivotable about a second pivot axis, and wherein the first pivot axis is parallel to the second pivot axis.

The trimmer of any clause herein, wherein the pivotable extension is pivotable about a third pivot axis that is parallel to the first pivot axis and the second pivot axis.

The trimmer of any clause herein, wherein movement of the trigger from the off position to the on position causes the pivotable extension to pivot when the switch is in the safe position.

The trimmer of any clause herein, further comprising a motor disposed in the handle assembly that is operable to actuate the working head when the trigger is in the on position.

The trimmer of any clause herein, further comprising a port configured to receive a battery for powering the motor.

The trimmer of any clause herein, wherein the switch is biased towards the safe position and wherein the trigger is biased towards the off position.

The trimmer of any clause herein, wherein the working head comprises a string or a blade.

A handle assembly for operating a working implement via a motor, the handle assembly comprising a trigger movable between an off position and an on position, wherein the trigger being in the on position causes the motor to actuate the working implement; and a lock off assembly. The lock off assembly comprises a switch movable between a safe position and an operate position; and a pivotable extension pivotably connected to the switch, wherein the pivotable extension contacts and blocks the trigger when the switch is in the safe position and the trigger is moved from the off position towards the on position, and wherein the trigger is free to move between the off position and the on position when the switch is in the operate position.

The handle assembly of any clause herein, wherein the trigger is partially disposed in a housing of the handle assembly.

The handle assembly of any clause herein, wherein the switch is partially disposed in the housing of the handle assembly.

The handle assembly of any clause herein, wherein the pivotable extension is entirely disposed in the housing of the handle assembly.

The handle assembly of any clause herein, wherein the trigger is pivotable about a first pivot axis, and wherein the switch is pivotable about a second pivot axis.

The handle assembly of any clause herein, wherein the first pivot axis is parallel to the second pivot axis.

The handle assembly of any clause herein, wherein the pivotable extension is pivotable about a third pivot axis that is parallel to the first pivot axis and the second pivot axis.

The handle assembly of any clause herein, wherein movement of the trigger from the off position to the on position causes the pivotable extension to pivot when the switch is in the safe position.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A trimmer comprising:
a working head;
a handle assembly connected to the working head by a connecting member;
a trigger connected to the handle assembly and movable between an off position and an on position, wherein the trigger being in the on position causes actuation of the working head; and
a lock off assembly comprising:
a switch connected to the handle assembly and movable between a safe position and an operate position; and
a pivotable extension pivotably connected to the switch,
wherein the pivotable extension contacts and blocks the trigger when the switch is in the safe position and the trigger is moved from the off position towards the on position, and
wherein the trigger is free to move between the off position and the on position when the switch is in the operate position.

2. The trimmer of claim 1, wherein the trigger is partially disposed in the handle assembly.

3. The trimmer of claim 1, wherein the switch is partially disposed in the handle assembly.

4. The trimmer of claim 1, wherein the trigger is pivotably connected to the handle assembly.

5. The trimmer of claim 1, wherein the switch is pivotably connected to the handle assembly.

6. The trimmer of claim 1, wherein the trigger is pivotable about a first pivot axis, wherein the switch is pivotable about a second pivot axis, and wherein the first pivot axis is parallel to the second pivot axis.

7. The trimmer of claim 6, wherein the pivotable extension is pivotable about a third pivot axis that is parallel to the first pivot axis and the second pivot axis.

8. The trimmer of claim 1, wherein movement of the trigger from the off position to the on position causes the pivotable extension to pivot when the switch is in the safe position.

9. The trimmer of claim 1, further comprising a motor disposed in the handle assembly that is operable to actuate the working head when the trigger is in the on position.

10. The trimmer of claim 9, further comprising a port configured to receive a battery for powering the motor.

11. The trimmer of claim 1, wherein the switch is biased towards the safe position and wherein the trigger is biased towards the off position.

12. The trimmer of claim 1, wherein the working head comprises a string or a blade.

13. A handle assembly for operating a working implement via a motor, the handle assembly comprising:
a trigger movable between an off position and an on position, wherein the trigger being in the on position causes the motor to actuate the working implement; and
a lock off assembly comprising:
a switch movable between a safe position and an operate position; and
a pivotable extension pivotably connected to the switch,
wherein the pivotable extension contacts and blocks the trigger when the switch is in the safe position and the trigger is moved from the off position towards the on position, and
wherein the trigger is free to move between the off position and the on position when the switch is in the operate position.

14. The handle assembly of claim 13, wherein the trigger is partially disposed in a housing of the handle assembly.

15. The handle assembly of claim 14, wherein the switch is partially disposed in the housing of the handle assembly.

16. The handle assembly of claim 15, wherein the pivotable extension is entirely disposed in the housing of the handle assembly.

17. The handle assembly of claim 13, wherein the trigger is pivotable about a first pivot axis, and wherein the switch is pivotable about a second pivot axis.

18. The handle assembly of claim 17, wherein the first pivot axis is parallel to the second pivot axis.

19. The handle assembly of claim 18, wherein the pivotable extension is pivotable about a third pivot axis that is parallel to the first pivot axis and the second pivot axis.

20. The handle assembly of claim 19, wherein movement of the trigger from the off position to the on position causes the pivotable extension to pivot when the switch is in the safe position.

* * * * *